May 26, 1964  KEIJI OKANIWA  3,134,835
APPARATUS FOR RECOVERING WASTE GAS FROM OXYGEN TOP
BLOWING CONVERTER IN UNBURNED STATE
Filed June 3, 1960  3 Sheets-Sheet 1

INVENTOR.
BY  KEIJI OKANIWA

Figure 3:
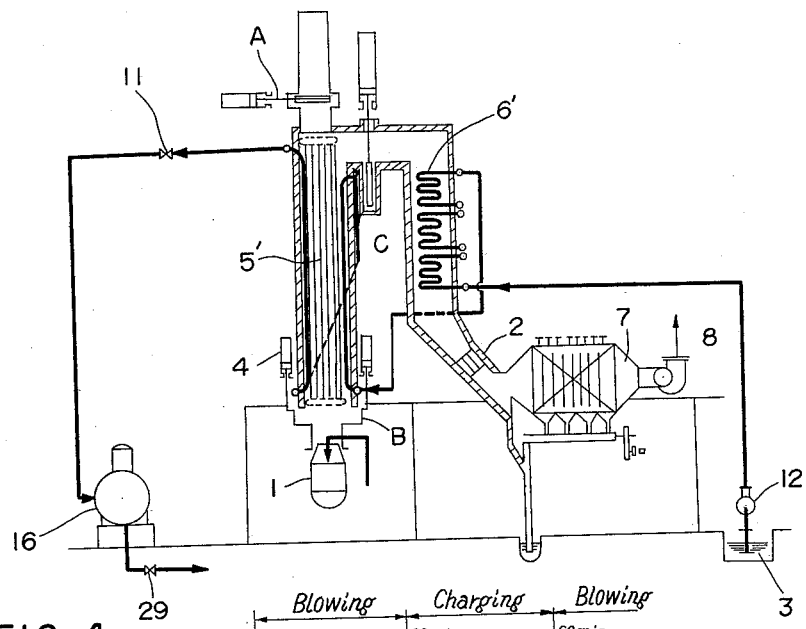
Figure 4:
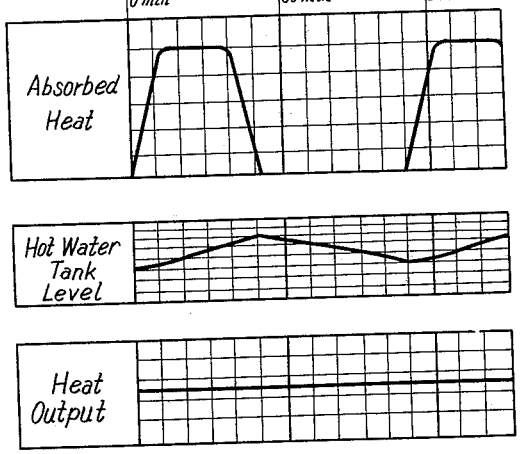
Figure 6:
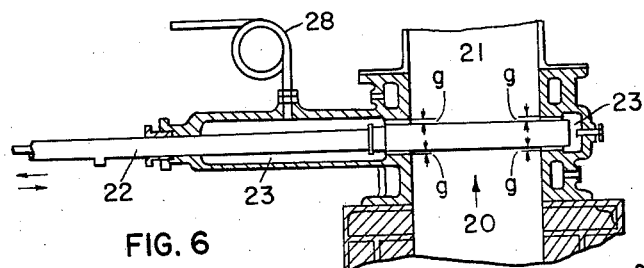

May 26, 1964 KEIJI OKANIWA 3,134,835
APPARATUS FOR RECOVERING WASTE GAS FROM OXYGEN TOP
BLOWING CONVERTER IN UNBURNED STATE
Filed June 3, 1960 3 Sheets-Sheet 2
FIG. 3
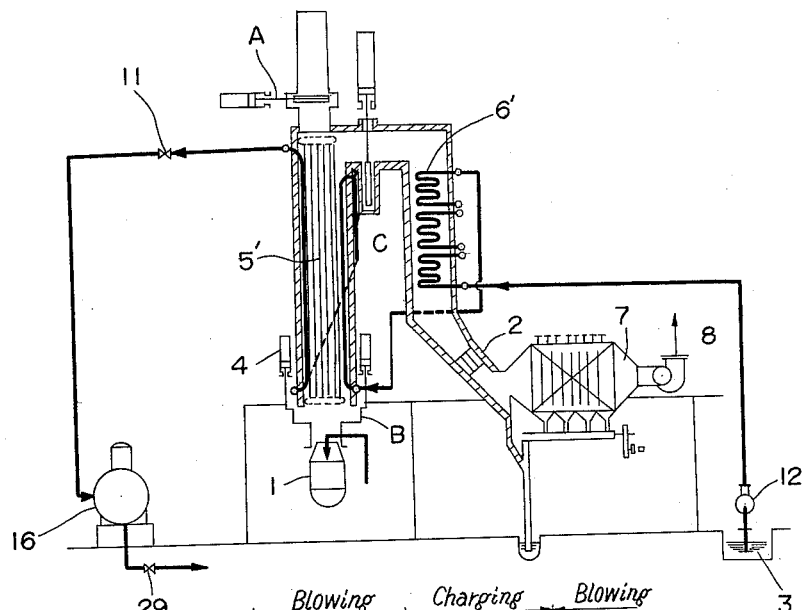
FIG. 4
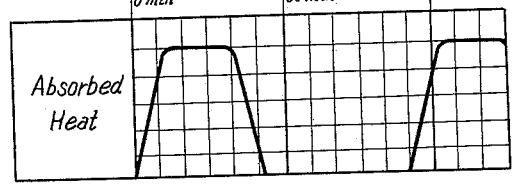
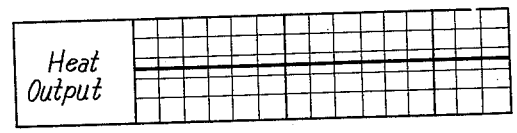
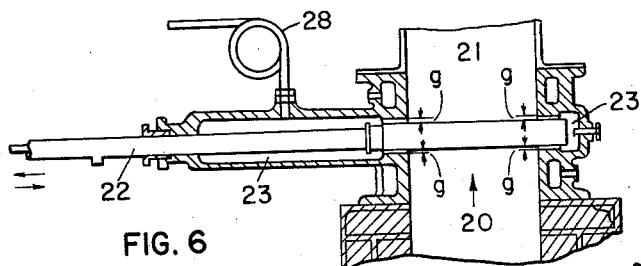
FIG. 6
INVENTOR.
BY KEIJI OKANIWA
Wenderoth, Lind & Ponack
attys.

INVENTOR.
BY KEIJI OKANIWA

United States Patent Office 3,134,835
Patented May 26, 1964

3,134,835
APPARATUS FOR RECOVERING WASTE GAS FROM OXYGEN TOP BLOWING CONVERTER IN UNBURNED STATE
Keiji Okaniwa, Yokohama, Kanagawa Prefecture, Japan, assignor to Yawata Iron and Steel Co., Ltd., and Yokoyama Engineering Co., Ltd., both of Tokyo, Japan
Filed June 3, 1960, Ser. No. 33,713
Claims priority, application Japan July 4, 1959
2 Claims. (Cl. 266—35)

The present invention relates to method and apparatus for recovering waste gas issuing from an oxygen top blowing converter in an unburned state, and more particularly, to a system for the recovery of waste gas by providing a sealing mantle into which an inert gas is forcibly introduced between the mouth of the converter and the waste gas cooling zone during the oxygen blowing operation in order to exclude air from the waste gas cooling zone.

Usually, waste gas from an oxygen top blowing converter is allowed to mix with air immediately after it is discharged from the mouth thereof, burned to fire waste heat boilers, and all of its energy including sensible and combustible heat is recovered and utilized as fully as possible. However, a boiler of this type has several disadvantages enumerated below:

(1) A waste heat boiler must have a large capacity, and hence its operation is complicated. As the volume of waste gas issuing from the converter is an immense one which varies abruptly in a periodic cycle of about twenty minutes, a boiler of an enormous capacity is required in order to fully recover and utilize all the heat energy including both sensible and combustible heat. However, the average heat recovery decreases to less than one-fourth of the maximum waste heat per converter in spite of an exorbitant cost for installing such a boiler having an enormous capacity, because the available waste gas is developed periodically, which is a disadvantage in that relatively little heat recovery is obtained in spite of a high cost waste heat boiler. For instance, a boiler installed for a converter having a capacity of 70 tons per hour has the capacity to produce steam at a rate of about 120 tons maximum per hour at a given moment, but, as a matter of fact it will actually produce only about 30 tons per hour on the periodical average. Prior art discloses that a boiler of an immense capacity is provided above a converter to recover waste heat with a view to obtaining a high pressure steam by utilizing a readily combustible gas, hence its operation is so complicated that a frequent disruption of the converting operation, the main process step of the whole operation, is caused due to the troubles of the boiler.

(2) Heat efficiency of a waste heat boiler is very low. The waste gas from the oxygen top blowing converter contains carbon monoxide up to 85% of the whole waste gas with a heat energy amounting to about 2580 to 2900 Kcal. per cubic meter, which is valuable for a gaseous fuel. A conventional boiler adapted to be fired by the waste gas from the converter has an efficiency as low as about 60%, the cause of which is due to the fact that the gas is mixed with an excessive amount of air and a water spray cooling step is carried out at a later stage in operating the boiler.

(3) Gas cleaning is difficult because the major part of finely divided iron oxide carried by the waste gas consists of ferric oxide, $Fe_2O_3$. The oxides of iron are stable at various temperatures in the order ferrous oxide, $FeO$, ferrosoferric oxide, $Fe_3O_4$ and ferric oxide, $Fe_2O_3$. At a temperature of the gas at the exit of the boiler lower than 570° C., a large part of the finely divided iron oxide is discharged in the form of ferric oxide $Fe_2O_3$. This ferric oxide $Fe_2O_3$ is so finely divided compared to ferrous oxide $FeO$ that either dust separation or gas cleaning is very difficult in a conventional boiler fired by the waste gas from the converter.

The present invention seeks to overcome the above disadvantages and provide a method and apparatus for recovering sensible heat for use in fuel and other industrial purposes to enable separating dust from the waste gas from the converter and collecting the cooled cleaned gas for burning at a later time, in which the gas issuing from the converter is immediately insulated from the contact with the atmosphere by shielding it with an inert gas, such as, nitrogen and in which it is cooled by passing it through an ascending and descending cooling zone provided with a plurality of annular water pipes which can be cooled in accordance with the volume of waste gas.

An object of the invention is to provide a smaller and less expensive apparatus than prior art apparatus for treating the waste gas issuing from an oxygen top blowing converter in which only the sensible heat thereof is fully recovered and utilized to advantage at the time the gas is produced.

Figure 1:
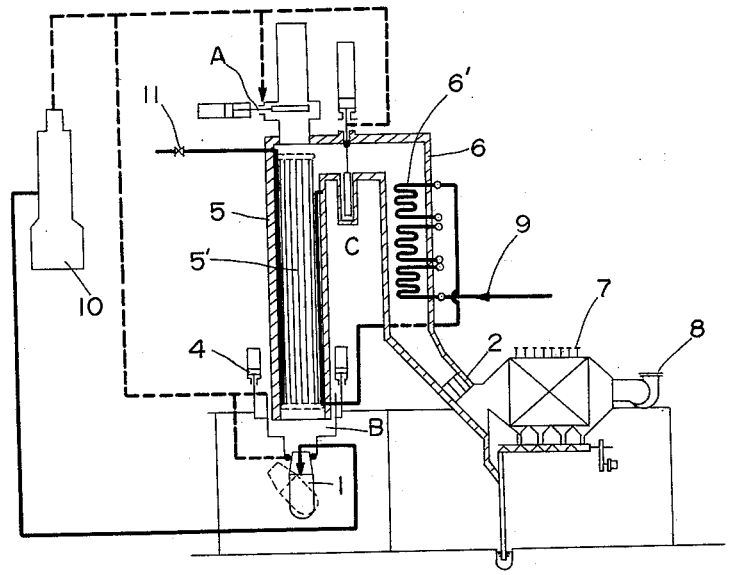
Figure 2:
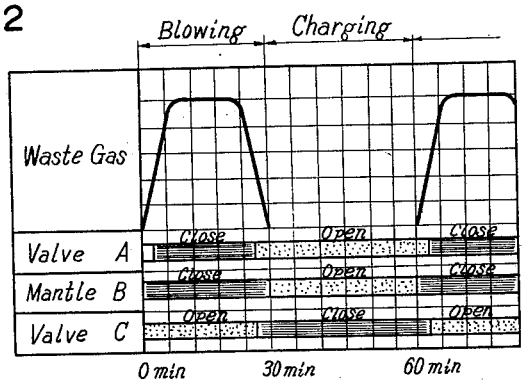

For a better understanding of the present invention, reference may be had to the accompanying drawings in which:

FIG. 1 is a diagrammatic view of the whole arrangement of the invention.
FIG. 2 is a blowing diagram of a converter.
FIG. 3 is a cooling system diagram of the invention.
FIG. 4 is a graph diagram of FIG. 3.
FIG. 5 is a sectional view of a seal around the mouth of the converter embodying the invention.
FIG. 6 is a sectional view of an exhaust valve.
FIG. 7 is a sectional view of a gate valve.

Referring more particularly to FIG. 1 which shows an apparatus for recovering the waste gas embodying the present invention, a technically pure oxygen produced by an oxygen plant 10 is blown onto the molten iron from above in order to refine it in a converter 1. The waste gas produced thereby is immediately insulated from contact with the open atmosphere by covering the mouth of the converter with a sealing jacket B driven by a pair of piston cylinder mechanisms 4. The gas has a temperature of about 1800° C., when it is delivered into the first flue 5 of the gas cooling zone provided immediately above the converter. The waste gas is cooled considerably during its passage through the first flue 5 by its passage over a coil of water cooled pipe 5' around the outside of the first flue 5. Thereafter the initially cooled gas is delivered into the second flue 6. Inside the second flue 6 there is also provided a coil of water cooled pipe 6', and as the gas passes over it, the gas is cooled more and more. The cooled gas is passed through a stabilizer 2 to an electrostatic precipitator 7 for cleaning, and then is delivered into a gas holder. An exhaust gate valve A and a gate valve C are installed to enable either the first or the second flues to be joined or sealed off from each other, the valve A opening to the atmosphere so that the operation of the converter can be continued in case any trouble occurs in the second flue or the apparatus beyond it. The inert gas, such as nitrogen, for use in the sealing jacket is supplied from a suitable source, and a dotted line shows a piping system which utilizes the nitrogen discharged from the oxygen plant 1 for producing oxygen to be blown into the converter for refining the metal therein. Cooling water passes through the apparatus in the direction of an arrow 9 from the second to the first flue to cool the waste gas, and then hot water is discharged from a thermostat valve 11.

FIG. 2 is a diagram showing the performance of the exhaust valve A, the sealing jacket B, and the gate valve C, respectively, during the operation of the converter. As shown in FIG. 2, the exhaust valve A and the sealing jacket B are closed and the gate valve C is opened during the oxygen top blowing step while, on the other hand, the exhaust valve A and the sealing jacket B are opened and the gate valve C is closed immediately after the completion of the blowing step. During the interval between blowing steps, the molten pig iron is charged into it.

FIG. 3 shows, in diagrammatic form, the recovery of waste heat in accordance with the invention. As described hereinbefore, the hot gas developed in the converter 1 is cooled by the water cooled pipes 5' and 6' installed in the first and second flue, is cleaned by the electrostatic precipitator 7, and is delivered into the gas holder by means of a blower 8. Cooling water is lifted from a water tank 3 by a pump 12, passes through the annular water cooled pipe 6' in which it is heated a little, is then heated still more in the water cooled pipe 5' installed in the first flue pipe, and finally is stored in the hot water tank 16 through a known thermostat valve 11. By means of a flow control valve 29 which permits only a predetermined amount of hot water to be drawn, a definite amount of water is taken out irrespective of the oxygen top blowing operation of the converter.

A graph diagram illustrated in FIG. 4 shows the heat to be absorbed, the water level in the water tank, and the heat recovered from the water tank, respectively, during the converting operation of the converter. The temperature of water at the exit is always kept constant by the thermostat valve 11, hence the recovery of heat is proportional to the rate of water flow at every moment. Accordingly, the water level in the tank varies, but a definite amount of hot water having a definite temperature can be taken out. In this way, the gas is rapidly cooled and cleaned while a definite amount of heat is recovered, and the collected active iron powder is recovered in the form of ferrous oxide FeO.

FIG. 5 shows an embodiment of the sealing jacket installed between the waste gas cooling zone and the mouth of the converter. The sealing jacket B is raised up and down by a pair of piston cylinder mechanisms 4 operated by a remote controlled hydraulic system, such as, oil, water or air pressure, or any other suitable means. The area of the jacket adjacent the mouth of the converter as well as the area opposed to the outer periphery of the lower end of the gas cooling zone are provided with a lower labyrinth 18 and an upper labyrinth 19. Into these labyrinth, each of which has a plurality of grooves therein opening outwardly of the areas in which the labyrinths are located, an inert gas, such as, nitrogen, is introduced through the slots 14 and 15 of labyrinths. Further, a suitable clearance is provided between the area of the labyrinths adjacent the mouth of the converter as well as the outer periphery of the end of the waste gas cooling zone so that the waste gas from the converter is completely isolated from the open atmosphere except for a very small amount of inert gas added thereto when the sealing jacket assumes its lowermost position.

Immediately prior to the tilting of the converter after the completion of blowing and pouring the molten steel therefrom, the sealing jacket B is lifted by the cylinder 4 through the remote control so as to provide a sufficient clearance between the lower end of the waste gas cooling zone and the mouth of the converter. Thus the waste gas from the converter can be recovered for a gaseous fuel or other industrial purposes.

FIG. 6 shows the construction of the exhaust valve provided on the top of the waste gas cooling zone, and the valve and valve body are the same construction as a known type, but are characterized in that the space between the valve seat and the valve body is filled with nitrogen or other inert gas under pressure. The communication between the top end of the first flue 20 and the exhaust pipe 21 is either continued or discontinued by the horizontal reciprocation of the valve stem 22 on the top end of the first flue. When it is discontinued, the space 23 within the valve body is filled with the inert seal gas, and a very small amount thereof will escape from the gap $g$. Thus, when the valve is closed, the waste gas cooling zone is completely isolated from contact with the open atmosphere.

FIG. 7 shows a gate valve C, the function of which is to prevent the recovered gas from passing into the second flue. The valve plate 26 moves up and down within the valve body 29, and the space between the valve and the valve seat 27 is filled with the inert gas under pressure introduced through the conduit 28. When the valve is closed, the first flue is cut off from the second flue except for the escape of a very small quantity of inert gas out of the gap $g$.

*Example*

An oxygen top blowing converter with a capacity of 2 tons is equipped with a waste gas recovering apparatus in accordance with the present invention, the results of which are described hereinbelow:

When 2 tons of molten pig iron are charged into the converter and 60 cubic meters of oxygen per ton of metal are blown onto it from above, 895 cubic meters of waste gas having a temperature of 1,400° C. per hour are developed at the peak of the blowing operation. It is found that this waste gas consists of 81% $CO$ and 16% $CO_2$. 141 cubic meters of nitrogen per hour are introduced into the joint in order to insulate the ascending waste gas stream from the open atmosphere. About half of the gas invades into the converter so that the gas is diluted, which results in the recovery of 965 cubic meters per hour of the gas having an analysis of 75.1% $CO$ and 14.8% $CO_2$.

The gas is water cooled as low as the temperature of 300° C., then it is again cooled and cleaned in a two stage Venturi-type scrubber by water spray of 2,440 kg. per hour, thus the cleaned gas is recovered at the temperature of 72° C. The recovered clean gas is kept in the gas holder and subjected to cooling as low as room temperature. This gas can be utilized as a useful gas.

The cooling water of the gas cooling zone cools the radiation heated surface of the rear part of the smoke pipe at the rate of 3,440 kg. per hour at a temperature of 86.5° C. with the result that 580 kg. per hour of steam under the pressure of 1.5 kg. per square centimeter and 2,860 kg. per hour of saturated hot water are obtained.

When the waste gas issuing from the mouth of the converter contains 110 g. of dust per cubic meter, the dust is almost removed therefrom to produce the gas of up to 96% purity.

I claim:

1. In an apparatus for conducting waste gases away from an oxygen top blowing converter to a recovery apparatus, said conducting apparatus having a gas cooling mechanism consisting of a first flue and a second flue connected only at the tops thereof, an exhaust valve at the top of the first flue, a gate valve provided in the connection between the tops of the first and second flues, means for forcing an inert gas into a gap in the seat of said valve for sealing the valve, and a heat absorbing water cooling mechanism provided with a plurality of cooling tubes to absorb the sensible heat of the waste gas in said gas cooling mechanism, in combination therewith that improvement comprising a movable sealing jacket adapted to be positioned around the bottom of the first flue of said gas cooling mechanism, means coupled to said jacket for moving said jacket upwardly and downwardly along said first flue toward and away from a converter, said jacket having a sealing face around said flue and a sealing face adapted to be opposed to a face on the converter when said jacket is in sealing relationship with a converter, each sealing face in said jacket having a plurality of grooves therein opening outwardly of said face to cause gas therein to stagnate in said grooves, and means connected to said grooves for supplying an inert gas under pressure to said grooves.

2. The improvement as claimed in claim 1 in which said grooves extend circumferentially of said jacket.

References Cited in the file of this patent

UNITED STATES PATENTS

| | | |
|---|---|---|
| 2,079,019 | Karwat | May 4, 1937 |
| 2,081,697 | Falla | May 25, 1937 |
| 2,239,895 | Kuhner | Apr. 29, 1941 |
| 2,572,253 | Fellows et al. | Oct. 23, 1951 |
| 2,776,092 | Collins | Jan. 1, 1957 |
| 2,831,467 | Guczky | Apr. 22, 1958 |
| 2,855,292 | Vogt | Oct. 7, 1958 |

FOREIGN PATENTS

| | | |
|---|---|---|
| 772,632 | Great Britain | Apr. 17, 1957 |